(12) United States Patent
Best

(10) Patent No.: US 7,505,692 B2
(45) Date of Patent: Mar. 17, 2009

(54) SYSTEM AND METHOD FOR OPTICAL TRANSMISSION

(75) Inventor: Bryant A. Best, Flowery Branch, GA (US)

(73) Assignee: Cisco Technology, Inc., San Jose, CA (US)

( * ) Notice: Subject to any disclaimer, the term of this patent is extended or adjusted under 35 U.S.C. 154(b) by 665 days.

(21) Appl. No.: 10/930,214

(22) Filed: Aug. 31, 2004

(65) Prior Publication Data

US 2006/0045529 A1    Mar. 2, 2006

(51) Int. Cl.
*H04B 10/00* (2006.01)

(52) U.S. Cl. .......................... 398/182; 398/66; 398/192

(58) Field of Classification Search ......... 398/182–201, 398/66–72
See application file for complete search history.

(56) References Cited

U.S. PATENT DOCUMENTS

| | | | | |
|---|---|---|---|---|
| 4,009,385 A | * | 2/1977 | Sell ......................... | 372/38.07 |
| 4,621,376 A | * | 11/1986 | Nakamura et al. ........... | 398/197 |
| 4,709,416 A | * | 11/1987 | Patterson ..................... | 398/197 |
| 4,718,118 A | * | 1/1988 | Viola .......................... | 398/197 |
| 4,884,280 A | * | 11/1989 | Kinoshita ................. | 372/29.02 |
| 5,050,239 A | * | 9/1991 | Albouy et al. .............. | 398/197 |
| 5,065,456 A | * | 11/1991 | Nakayama .................. | 398/197 |
| 5,268,916 A | * | 12/1993 | Slawson et al. ........ | 372/29.021 |
| 5,319,656 A | * | 6/1994 | Geller .................... | 372/29.014 |
| 5,402,433 A | * | 3/1995 | Stiscia ......................... | 372/31 |
| 5,488,621 A | * | 1/1996 | Slawson et al. ............... | 372/31 |
| 5,563,898 A | * | 10/1996 | Ikeuchi et al. ............ | 372/38.07 |
| 5,724,170 A | * | 3/1998 | Aizawa ...................... | 398/197 |
| 5,963,570 A | * | 10/1999 | Gnauck et al. ........... | 372/38.01 |
| 6,188,498 B1 | * | 2/2001 | Link et al. ................... | 398/195 |
| 6,219,165 B1 | * | 4/2001 | Ota et al. .................... | 398/197 |
| 6,490,727 B1 | * | 12/2002 | Nazarathy et al. ........... | 725/129 |
| 6,509,994 B2 | * | 1/2003 | West, Jr. ..................... | 398/192 |
| 2003/0174744 A1 | | 9/2003 | Reily .......................... | 372/32 |

FOREIGN PATENT DOCUMENTS

JP            07154016         6/1995

\* cited by examiner

*Primary Examiner*—Agustin Bello

(57) ABSTRACT

An optical system that includes an analog laser transmitter having a burst operative mode is disclosed. The system further includes a power controller that is configured to place the analog laser transmitter in the burst operative mode when a digital enable signal is provided to the power controller. The power controller comprises a reference voltage source, a ground node, and an input selector switch that is configured to select the reference voltage source when the digital enable signal is asserted, and alternatively, to select the ground node when the digital enable signal is de-asserted.

18 Claims, 7 Drawing Sheets

SYSTEM AND METHOD FOR OPTICAL TRANSMISSION

TECHNICAL FIELD

The present disclosure is generally related to optical systems, and, more particularly, is related to laser transmitters.

BACKGROUND OF THE DISCLOSURE

Optical transmission systems incorporating laser transmitters can be generally classified under two broad categories: analog systems and digital systems. In analog systems, the laser transmitter operates in an analog mode that can be described using the prior art optical system shown in FIG. 1. Laser transmitter 120 accepts an analog input signal via electrical line 110 and produces an output optical signal on optical link 140. In certain applications, the analog input signal may be a baseband analog signal such as a sine wave of a particular frequency, or a complex analog signal containing several frequency components. In other applications the analog input signal may be a modulated signal containing carrier frequency components. Typically, laser transmitter 120 is a broadband device that can accommodate the range of frequencies present in the input signal, and carries out an electrical-to-optical conversion process by converting the electrical-domain analog input signal into an optical-domain output optical signal.

Power controller 130 operates together with laser transmitter 120 to produce the output optical signal at a desired power level while simultaneously ensuring that laser transmitter 120 operates in a linear operative mode that produces certain desirable characteristics. Such desirable characteristics include output power accuracy, stability over time and environmental conditions, flat frequency response, and low harmonic distortion. Consequently, power controller 130 typically incorporates several temperature-stable components as well as feedback circuitry. The bandwidth and response time of the feedback circuitry is typically chosen to filter out unwanted high-frequency perturbations and to provide the desired characteristics mentioned above. As a consequence, the turn-on/turn-off times of the laser transmitter 120 is fairly long. While this may be acceptable for the analog system of FIG. 1, such lengthy turn-on/turn-off times prove unsuitable for digital mode operations wherein the laser transmitter has to be turned on and off more rapidly.

FIG. 2 illustrates a prior art optical system operating in a digital mode. Laser transmitter 220 accepts a digital input signal via electrical line 210 and produces an output optical signal on optical link 240. The digital input signal is typically a baseband signal that uses two or more logic levels. When two levels are used, the system is termed a binary system, and the laser transmitter operates in two distinct modes—either on or off. The on state corresponds to a first logic level, while the off state corresponds to a second logic level. The speed at which the laser transmitter 220 can change from one state to the other (e.g. from on to off) determines the maximum digital signal rate that can be accommodated. The degree of illumination or lack thereof in the output of the laser transmitter 220, often referred to as the extinction ratio, determines the error rate encountered in decoding the optical digital signal at a receiver located at the other end of optical link 240. For example, if the laser transmitter 220 did not turn off completely, an optical receiver at a distant end may erroneously interpret the digital logic present in optical link 240 at that instant as a logic "one" rather than a logic "zero." Consequently, laser transmitter 220 operates in a saturated mode of operation wherein a laser inside laser transmitter 220 is completely on or completely off. This is in contrast to the analog system of FIG. 1 where a laser inside laser transmitter 120 operates in a linear manner and produces various non-discrete levels of intensities.

Power controller 230 is designed to place laser transmitter 220 in the digital mode of operation where characteristics such as extinction ratio, rise and fall times, and bit rate are the primary criteria in contrast to characteristics such as flat frequency response and low harmonic distortion that are desirable in the system of FIG. 1. It can therefore, be appreciated that the two prior art systems illustrated in FIGS. 1 and 2, prove to have certain handicaps when a mixed mode of operation (digital and analog) is desired. Thus, a heretofore unaddressed need exists in the industry to address the aforementioned and/or other deficiencies and inadequacies.

BRIEF DESCRIPTION OF THE DRAWINGS

The preferred embodiments of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

While the description below refers to certain exemplary embodiments, it is to be understood that the disclosure is not limited to these particular embodiments. On the contrary, the intent is to cover all alternatives, modifications and equivalents included within the spirit and scope of the disclosure. Also, the terminology used herein is for the purpose of description and not of limitation.

Figure 1:
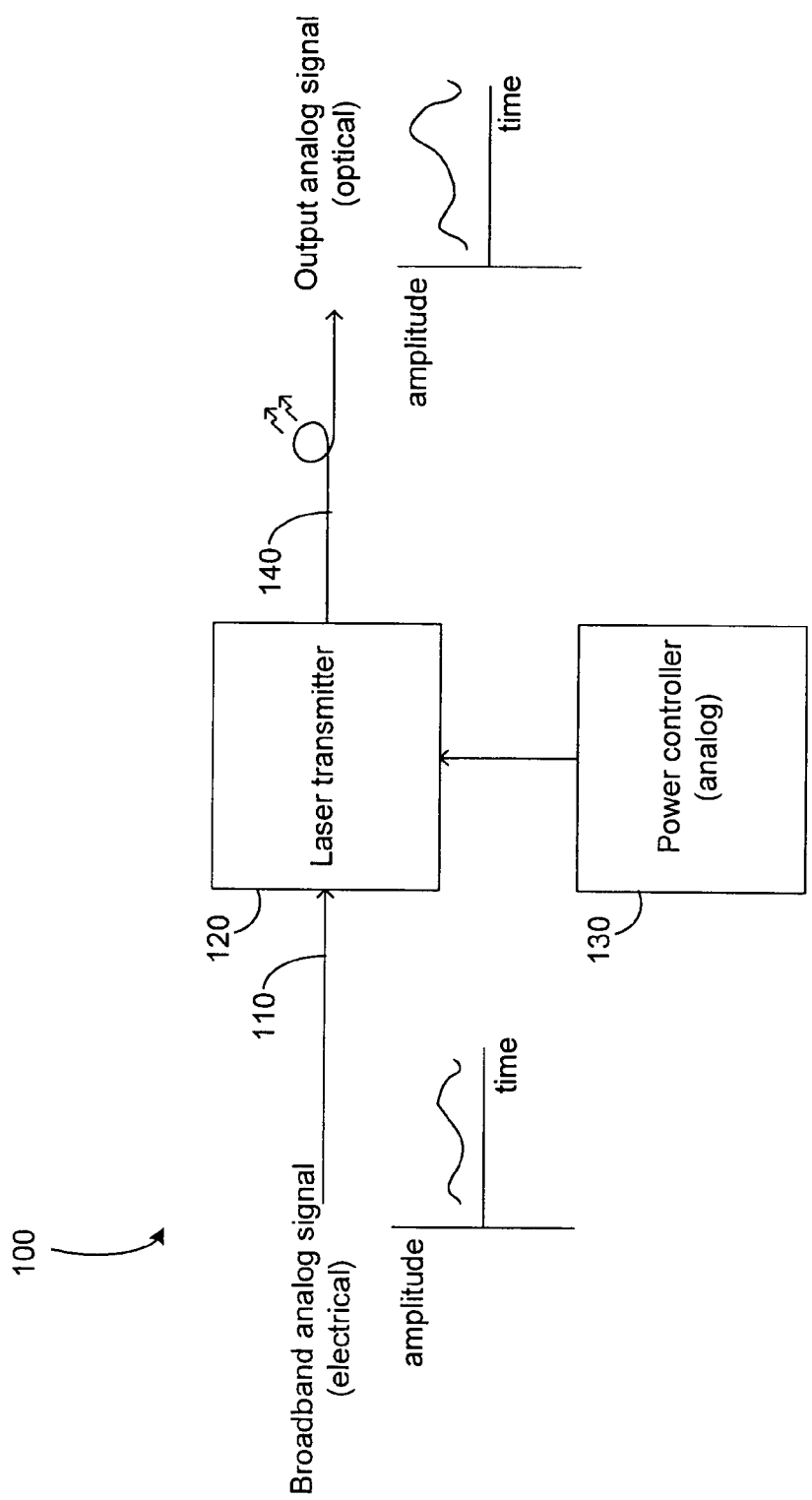
FIG. 1 illustrates a prior art optical system operating in an analog mode.
Figure 2:
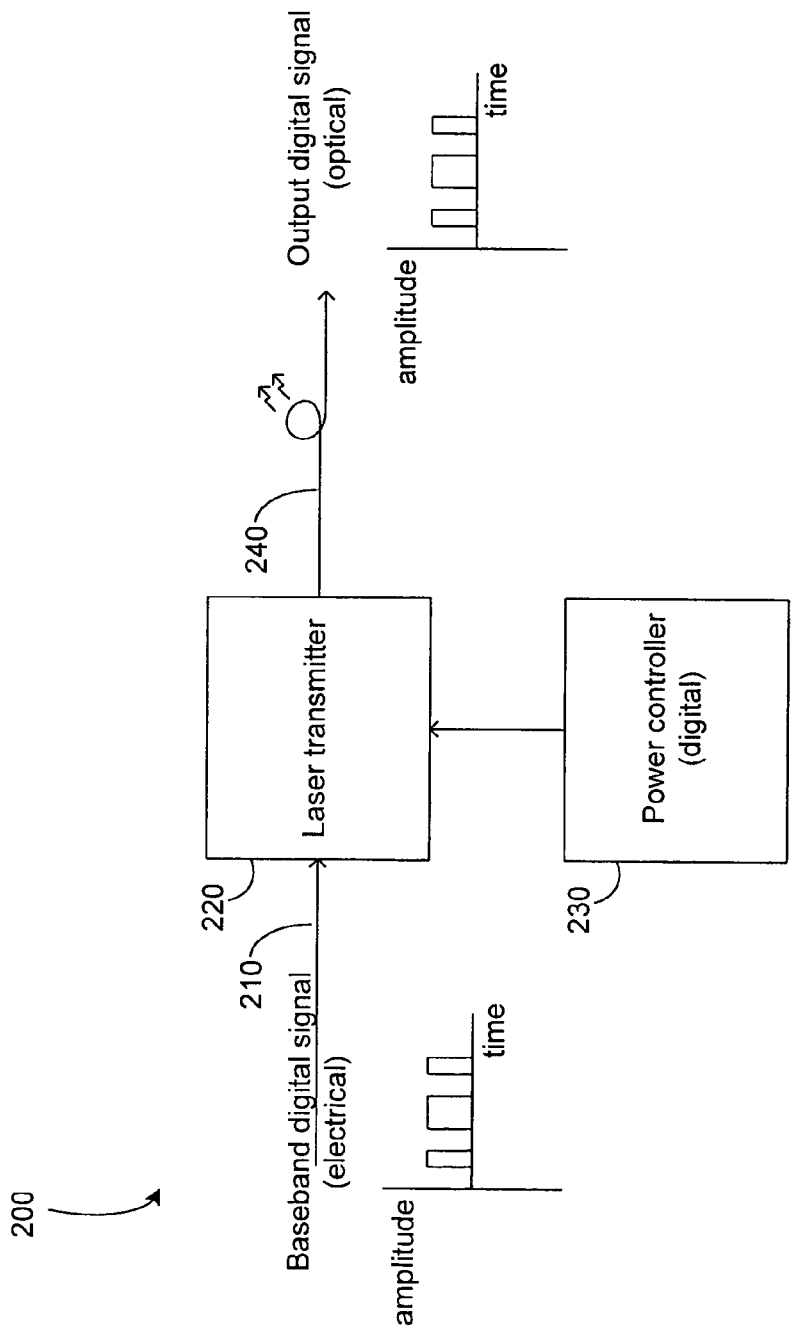
FIG. 2 illustrates a prior art optical system operating in a digital mode.
Figure 3:
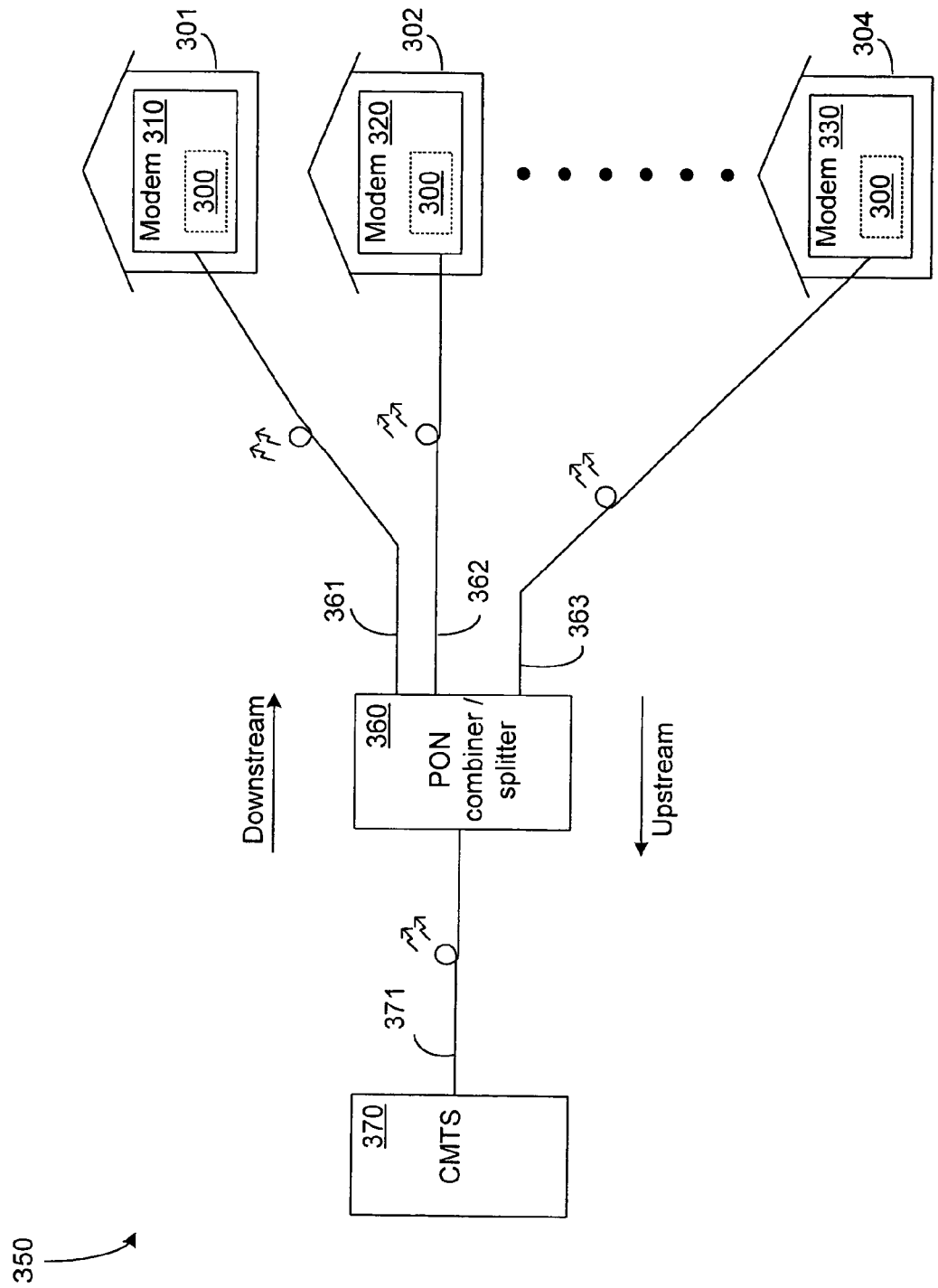
FIG. 3 illustrates an exemplary optical system that is a passive optical network (PON) system incorporating at least one modem located inside at least one residence.

Attention is drawn to FIG. 3, which illustrates an exemplary optical system 350 that is a passive optical network (PON) system incorporating at least one modem 310 located inside at least one residence 301. It will be understood that the modems 310, 320, and 330 shown in FIG. 3A are shown located inside their respective residences merely for purposes of illustrating one exemplary embodiment. In other alternative embodiments, one or more of these modems are installed external to a residence, for example inside a network interface device (NID). When installed external to the residence, the internal wiring of the residence is left undisturbed.

While PON systems are used in several types of communication networks, the system shown in FIG. 3 as an example system, is a part of a cable network. A few examples of communication networks that may utilize PON systems, include fiber-to-the-home (FTTH), fiber-to-the-curb (FTTC), and synchronous optical network (SONET) networks.

The major functional blocks of the optical system 350 include, in addition to the cable modems, a cable modem terminating system (CMTS) 370 and a PON combiner/splitter 360. System 350 can operate as a bi-directional optical system to provide multimedia cable services to multiple residences. A typical PON system may be designed to serve 32 residences, of which three (301, 302, and 304) are shown in FIG. 3.

Multimedia cable services include uni-directional services such as for example, video delivery of television and movies, as well as bi-directional services such as for example, Internet-related data. Typically, the data-flow, whether uni-directional or bi-directional, from CMTS 370 towards a residence is referred to as a downstream delivery, while data-flow from a residence towards the CMTS 370 is referred to as an upstream delivery. In the downstream direction, CMTS 370 originates an optical signal carrying the multi-media cable service. This optical signal is transported via optical link 371 to PON combiner/splitter 360. In the downstream direction, PON combiner/splitter 360 operates as a splitter, and distributes the downstream optical signal to multiple optical links such as links 361, 362, and 363. Among several transport formats that can be employed to transport the downstream signal, several communication systems use the time-division-multiplexing (TDM) format to combine multiple pieces of data, where the individual pieces are destined to individual residences. TDM is a well-known format, and will not be elaborated here, as persons of ordinary skill in the art will recognize this technology.

In the upstream direction, a modem, such as modem 310, originates data that is transported via optical links, such as link 361, to PON combiner/splitter 360. In the upstream direction, PON combiner/splitter 360 operates as a combiner, and combines multiple upstream optical signals from multiple optical links such as links 361, 362, and 363. The combined optical signal is then transported via link 371 from PON combiner/splitter 360 to CMTS 370. It can be understood that in combining several optical signals from multiple optical links, the PON combiner/splitter 360 may encounter data collisions that can corrupt the upstream data towards the CMTS 370. Such undesirable data corruption can occur if two modems are transmitting simultaneously at any given instance in time. Consequently, a transport technology such as time-division-multiple-access (TDMA) may be employed to avoid such corruption. TDMA is one of several transport mechanisms, others, for example, being wave-division-multiple-access (WDMA), code-division-multiple-access (CDMA), and subcarrier-multiple-access (SCMA).

In TDMA, each of the modems (e.g. modems 310, 320, and 330) are synchronized in time with each other. Typically, this is carried out using various methods, including "ranging" where the CMTS 370, or another upstream device, determines how far away in distance each modem is located, and assigns an optimal transmission time slot to each modem to avoid transmission interference with other modems. Various mechanisms are employed to carry out the time slot assignment. As one example among many, message-based signaling may be employed to convey the time slot information to the modems. Furthermore, various mechanisms are employed to ensure that no two TDMA time slots overlap one another as such overlaps can lead to data collisions. One such mechanism, employs guard bands that are periods between time slots where none of the modems perform upstream transmission. Naturally, the presence of guard bands is wasteful as they reduce the available data bandwidth for upstream transmission.

When no guard bands are employed, a first laser transmitter located in a first modem may not be completely turned off while a second laser transmitter in a second modem begins to emit light, thereby leading to the two light beams colliding with each other and leading to data loss or corruption. It can be understood that the laser transmitters should be turned on or turned off in a minimal amount of time to avoid wasting upstream bandwidth. It can also be understood that optical components of an optical system are typically expensive, and consequently, there is a need to provide systems that are cost-effective. The modems, such as for example, modem 310, include an upstream transmitter 300, which incorporates a laser transmitter and associated circuitry.

Figure 4:
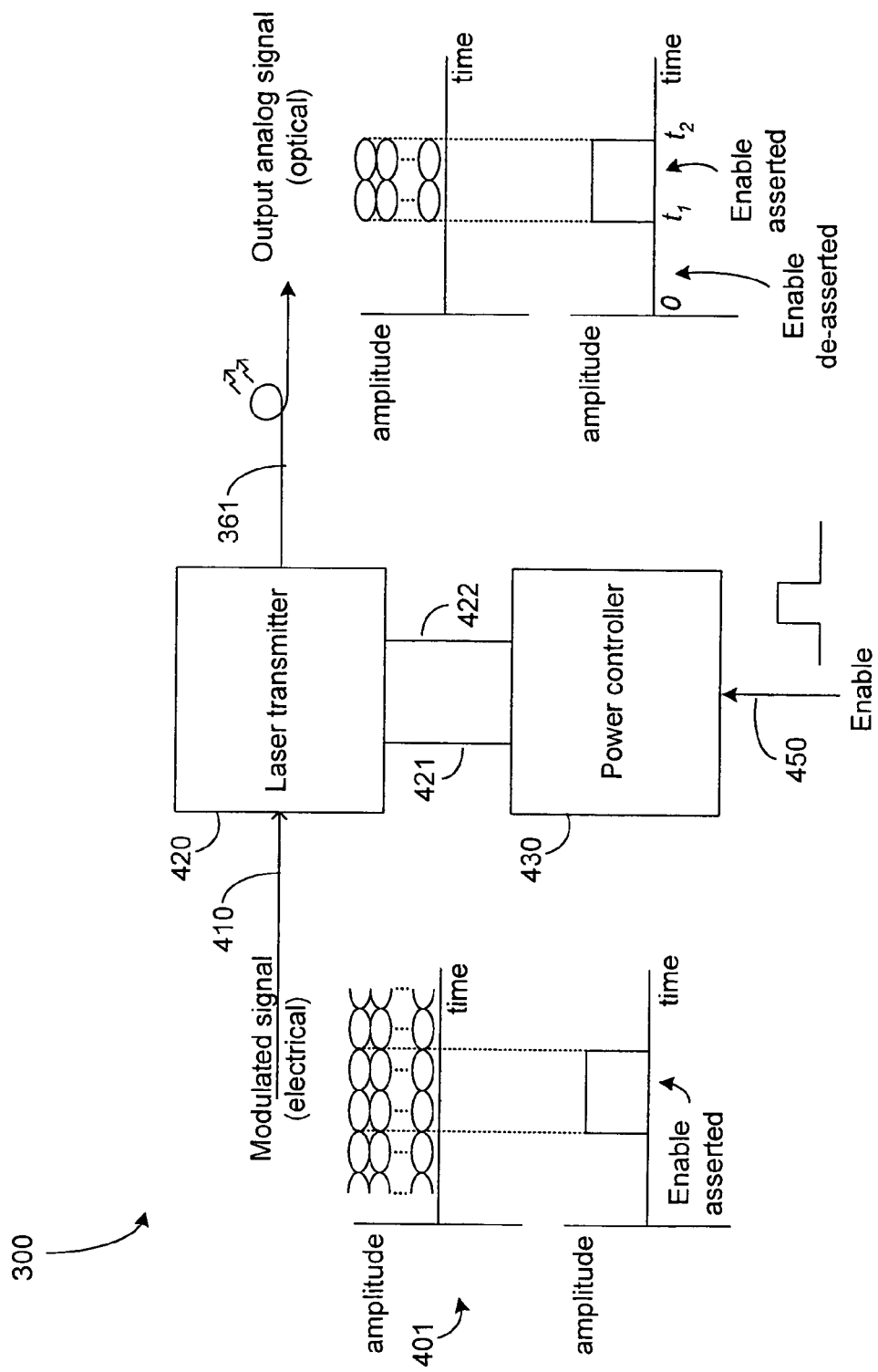
FIG. 4 is a block diagram of a laser transmitter and power controller that are located inside the modem of FIG. 3.

Attention is now drawn to FIG. 4, which illustrates a few functional blocks of one embodiment of an upstream transmitter 300 of optical system 350. In one exemplary embodiment, among many, upstream transmitter 300 is an analog-modulated cable TV (CATV) reverse transmitter operating in the range of 5 to 42 MHz (approximately), transmitting an optical signal of approximately 2 dBm power, the transmitter being designed to operate over a temperature range of −40° C. to +85° C.

Laser transmitter 420 receives an electrical signal via line 410 and transmits an optical signal into optical link 361, which transports the signal into PON combiner/splitter 360 of FIG. 3. The electrical signal on line 410 comprises analog as well as digital signals. In a first embodiment, among many, the electrical signal is an analog baseband signal. In a second embodiment, the electrical signal is an analog wideband signal. In a third embodiment, the electrical signal is a modulated analog signal comprising a radio-frequency (RF) carrier signal. In a fourth embodiment, the electrical signal is a modulated digital signal.

FIG. 4 depicts one example of an electrical signal. In this example, the electrical signal is a m-ary modulated signal 401. Where m=4, the m-ary signal is a quadrature amplitude modulated (QAM) signal. Where m=64, the m-ary signal is referred to as a 64QAM signal.

In a preferred embodiment of the disclosure, the electrical signal on line 410 comprises an upstream signal conforming to the Data Over Cable Service Interface Specification (DOCSIS). The DOCSIS specification, inclusive of its various versions, is incorporated herein by reference in its entirety. Persons of ordinary skill in the art will recognize that the upstream signal can employ various modulation schemes such as but not limited to, quadrature phase shift keying (QPSK), 64QAM, and 128QAM; and operate at various frequency ranges, such as, but not limited to, a range of 5 to 42 MHz. Furthermore, the upstream signal can operate at various data rates, for example, at 5.12 Msym/sec for a channel width of 6.4 MHz.

Laser transmitter 420 comprises a laser diode and a monitor diode that are components of an analog transmitter for transmitting analog signals. Typically, a laser transmitter such as laser transmitter 420 is a device designed for use in analog systems that operate the laser diode in a linear operative mode. In the present disclosure, laser transmitter 420 is configured to operate in a burst operative mode, wherein when the laser diode is turned on, the output optical signal on link 361 quickly reaches its desired operating power with low overshoot characteristics. In one exemplary embodiment, the optical signal reaches its operating power within approximately one microsecond, together with a transient response having less than substantially 5% overshoot. Similarly, when the laser diode is turned off, the optical signal on link 361 decreases quickly to zero with little undershoot. Such a configuration wherein the analog laser transmitter 420 is switched in a binary (on-off) mode is referred to as a burst operative mode.

Power controller 430 interacts with laser transmitter 420 to place the laser transmitter in the burst operative mode. Line 421 carries a monitor current produced in the monitor diode inside laser transmitter 420, while line 422 carries the current flowing through the laser diode inside laser transmitter 420. Power controller 430 uses the monitor current of line 421 to control the amplitude of the current flowing in line 422. Consequently, power controller 430 can configure a desired optical power output of the optical signal on link 361, and also control the presence/absence of this output signal (burst operative mode). In this embodiment, power controller receives an enable signal via line 450. When the enable signal is asserted, power controller 430 turns on the laser diode inside laser transmitter 420, and, alternatively, when the enable signal is not asserted, power controller 430 turns off the laser diode inside laser transmitter 420. This operation is shown in FIG. 4, wherein the output optical signal 402 is present between times $t_1$ and $t_2$ when the enable signal is asserted, and wherein the output optical signal is absent when the enable signal is not asserted as between times 0 and $t_1$.

Figure 5:
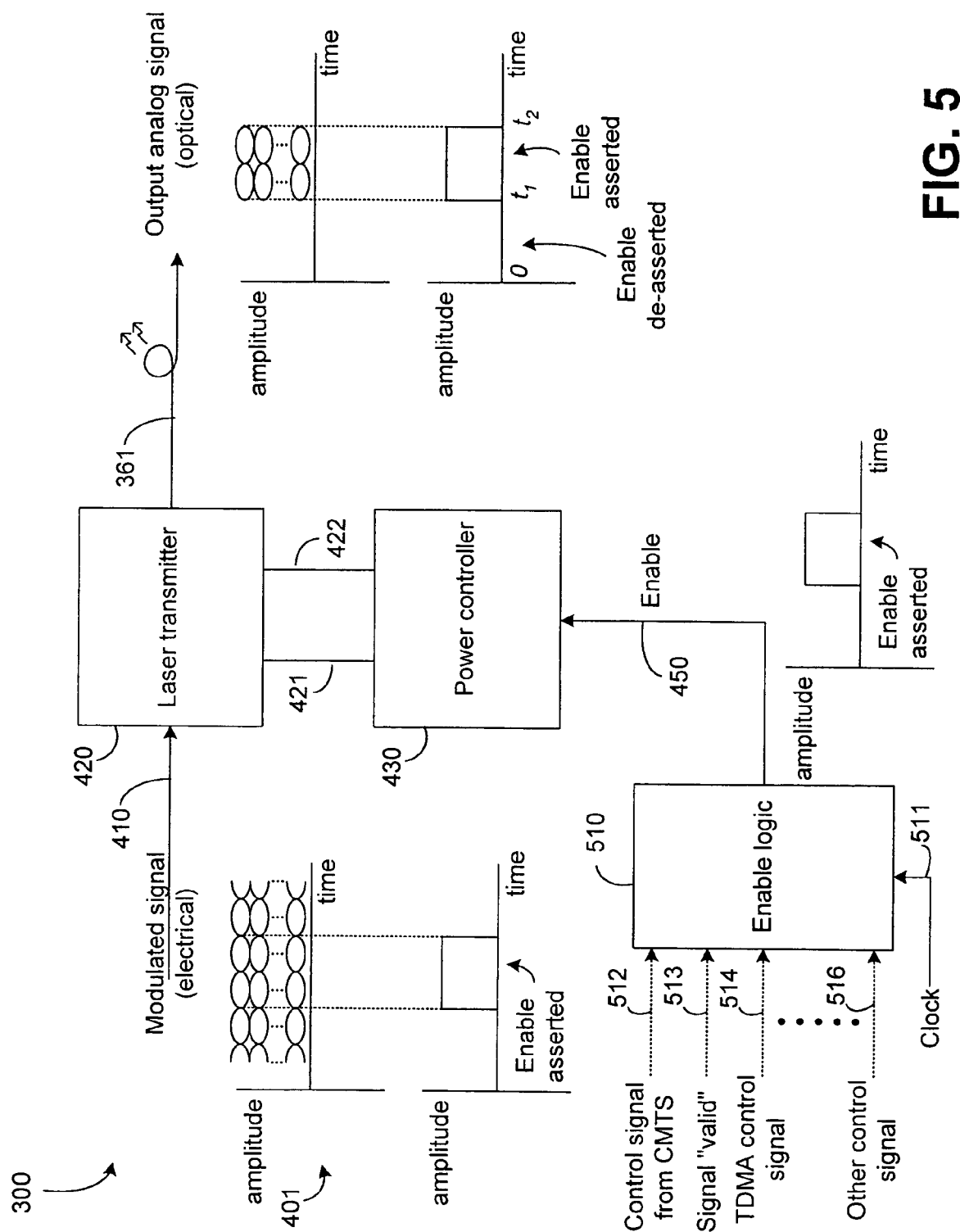
FIG. 5 shows an enable logic block associated with the laser transmitter and power controller blocks of FIG. 4.

Attention is now drawn to FIG. 5, which shows an additional block—enable logic 510. Enable logic 510 generates the enable signal carried on line 450 to power controller 430. A clock signal provided on line 511 ensures synchronous operation as is desirable in a TDMA implementation. The enable signal is generated using one or more trigger signals that are provided to enable logic 510. It will be understood that one or more of the trigger signals illustrated in FIG. 5 may be used in alternative embodiments.

Consequently, in a first embodiment only one trigger signal is connected to enable logic 510, while in other embodiments more than one trigger signal may be provided to enable logic 510. When more than one trigger signal is connected to enable logic 510, in a first embodiment, enable logic 510 selects one among the multiple trigger signal inputs, while in a second embodiment, enable logic 510 selects a combination of trigger signal inputs.

A few examples, among many of trigger signals, includes a control signal from CMTS 370. In one embodiment, the control signal that is carried on line 512, comprises a message that was embedded inside a downstream signal originated by CMTS 370, while in a second embodiment, the control signal comprises a logic signal that is asserted to indicate a trigger for generating the enable signal. Persons of ordinary skill in the art will understand that using a logic signal incorporates the use of logic levels and transition edges.

In an alternative embodiment, a trigger signal comprises a "signal valid" signal carried on line 513. One example of a circuit that originates the "signal valid" signal, is a carrier detect circuit 510 that is described in U.S. Pat. No. 6,509,994 B2, which is herein incorporated by reference. The carrier detect circuit is used to selectively activate the laser transmitter 420 through the power controller 430 only when such activation is necessary. Such a mode of activation allows power conservation, among other benefits.

In yet another alternative embodiment, trigger signal comprises a TDMA control signal carried on line 514. The TDMA control signal is generated by other circuitry (not shown) of upstream transmitter 300. Such a control signal can be generated in response to a message from CMTS 370, or can be locally generated in the upstream transmitter 300 using other means to synchronize with one or more modems of the optical system 350.

A fourth example of a trigger signal is shown on line 516. This trigger signal is derived from one or more synchronous sources, such as multiple modems or a central control processor located in the upstream transmitter 300.

Figure 6:
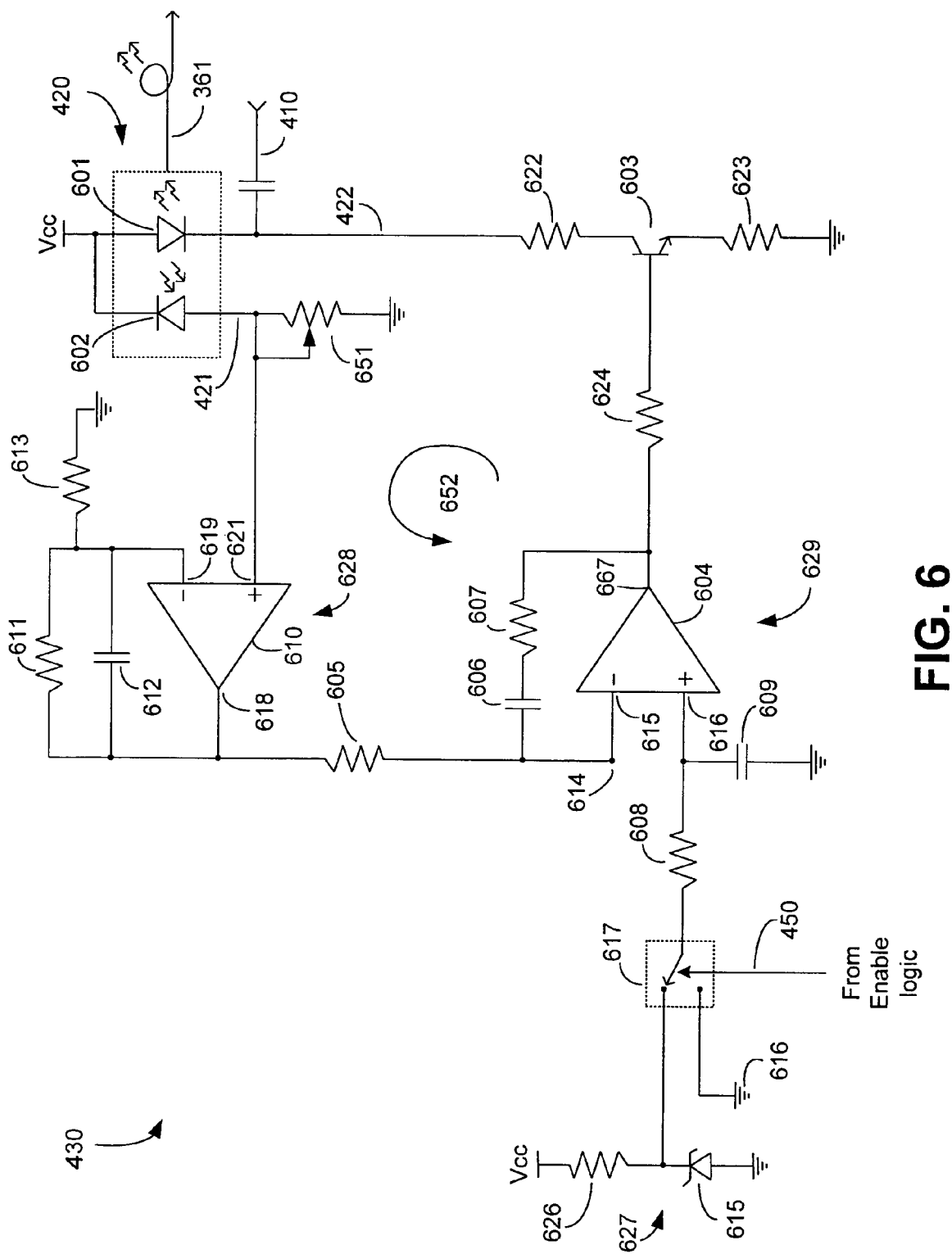
FIG. 6 illustrates component details of the circuitry contained in the power controller and laser transmitter blocks of FIG. 4.

Turning now to FIG. 6, which illustrates component details of the circuitry contained in one example of the power controller and laser transmitter blocks of earlier figures, attention is drawn to laser transmitter 420. Laser diode 601 is a laser diode that is optically coupled into optical link 361. Details of the optical coupling will be omitted in this disclosure, because persons of ordinary skill in the art will recognize the procedure to do so. Monitor diode 602, which is optically coupled to laser diode 601, provides a laser monitor current that is directly proportional to the current flowing through laser diode 601.

In general terms, FIG. 6 comprises a system wherein the laser monitor current is utilized in a feedback loop 652 to control the laser diode current and consequently, the optical power generated by the laser diode. The laser diode current is typically preset to a suitable value so as to produce a desired optical power from the laser diode whenever an enable signal is applied to the system via line 450. Because this optical power changes over time due to aging of the laser diode, the system of FIG. 6 changes the value of the laser current to compensate for the reduction in optical power. The operation will be better understood by the circuit description below.

The electrical signal applied through line 410 is capacitively coupled into the laser diode 601. While shown coupled into the cathode terminal of laser diode 601 it will be understood that there are several alternative coupling methods by which the electrical signal can be coupled into laser diode 601. The electrical signal alters the current flowing through laser diode 601 and consequently the optical signal appearing on link 361 reflects the characteristics of the electrical signal in the optical domain. The laser diode current on line 422 is also controlled by the transistor driver circuit comprising transistor 603, which is selected to have a suitable bandwidth of operation. Transistor 603 is illustrated in FIG. 6 as an npn device, but it will be understood that other devices can be used alternatively. Such alternative devices include pnp transistors, field-effect-transistors, and op-amp drivers. The collector-to-emitter current of transistor 603 is the same as the quiescent current flowing through laser diode 601. The amplitude of the collector-to-emitter current is determined by the base-to-emitter voltage that is applied by op-amp 604 via its output terminal 667, into transistor 603. Resistors 624, 622, and 623 are DC-biasing elements, and are selected to limit the base current, and to limit the collector-to-emitter current respectively. The collector-to-emitter current is set below the allowable maximum current through the laser diode 601, so as to avoid potential damage to the diode from excessive current flow. Resistors 622 and 623 also determine transistor driver gain, which directly affects loop parameters.

Op-amp 604 is a part of an integrator 629 that includes several resistor and capacitors, chosen appropriately to provide integrator functionality. The integrator time constant is largely determined by the values selected for resistor 605 and capacitor 606. The integrator time constant is generally selected to provide high gain for low-frequency signals that may be present in a feedback voltage that is present at feedback voltage node 614, which is connected to input terminal 615. The values for resistor 605 and capacitor 606 are selected to obtain a desirable damping factor, and furthermore, are selected such that the open loop frequency response of the integrator 629 in conjunction with a transimpedance circuit 628 comprising op-amp 610, reaches unity gain below the lowest modulating frequency present in the loop 652. Resistor 607 operates as a damping resistor, and is selected to improve the dynamic response of the loop 652. The dynamic response of the loop 652 includes fast settling time as well as a desirable transient response. Resistor 608 and capacitor 609 are typically selected to provide appropriate differential balance between input terminals 615 and 616 of op-amp 604.

Op-amp 610 and associated components comprise a transimpedance amplifier circuit 628 that converts the laser monitor current into a feedback control voltage that is provided to feedback voltage node 614. Resistor 611 is selected to be sufficiently small in value so that the pole caused by resistor 611 in conjunction with the input capacitance of the negative input terminal of op-amp 610 is high enough in frequency to avoid negative impact upon the loop phase margin. The loop phase margin is dominated by the pole contributed by the combination of resistor 611 in parallel with capacitor 612. Capacitor 612 is selected such that the transimpedance amplifier 610 provides attenuation above the lowest modulation frequency. The gain of the transimpedance amplifier 610 is set to compensate for a low value of resistance in the potentiometer 651, or alternatively, the gain is selected to permit a setting of a desired value of resistance in the potentiometer 651. The R-C time constant of the potentiometer 651 together with the intrinsic package capacitance of the laser transmitter 420 determines in part, the transient response of the loop 652, and if the potentiometer is selected improperly, can lead to excessive ringing and overshoot in the feedback voltage.

In this exemplary embodiment, zener diode 615 together with resistor 626 comprises a reference voltage source 627. In other embodiments, other circuits that generate a reference voltage may be used. Persons of ordinary skill in the art will recognize that there are many alternative circuits that can be used to generate a reference voltage. The components of the reference voltage source 627 are typically selected to have certain desirable operating characteristics over temperature and other environmental conditions. Input selector switch 617 is configured to select the reference voltage source 627 when the digital enable signal on line 450 is asserted, and alternatively, to select the ground node 616 when the digital enable signal on line 450 is de-asserted. While many alternative switches may be used, a solid state switch is used where fast switching times are desirable.

In one embodiment, among many, the zener diode 615 is a 2.5V zener, and input selector switch 617 provides this 2.5V to the first input terminal of the integrator 629, specifically, the positive input terminal of op-amp 604 in this example. When the reference voltage source is provided to the integrator 629, the laser diode current in line 422 begins to flow, thereby turning on the laser diode 601 and producing an output optical signal into link 361. When the laser diode current is flowing in line 422, the laser diode monitor current in line 421, which is proportional to the laser diode current, also begins to flow. The voltage drop across the potentiometer 651 is then translated by transimpedance amplifier 628 to generate a feedback voltage of 2.5V at feedback voltage node 614, and the feedback loop 652 stabilizes with a certain amount of time, and with certain timing characteristics.

When the input selector switch 617 operates to select ground node 616, the output voltage of integrator 629 tends to zero, thereby shutting off the laser diode current in line 422 and the output optical signal on link 361. The operation of input selector switch 617 places the feedback circuit in the burst operative mode, because the enable logic on line 450 is digital in nature, and the output optical signal is turned on and turned off in a digital mode. Zener diode 615 is selected to provide a zener voltage that lies in a range between the voltage rails of op-amp 604. Zener diode 615 is also selected to have good temperature stability. The output power is set by operating potentiometer 651. For example, if the potentiometer is set to cause a first laser diode monitor current to flow in line 421, the feedback loop 652 operates to cause the laser diode current on line 422 to follow suit such that the monitor current can be maintained at the selected value. The laser diode current directly determines the power of the output optical signal.

Figure 7:
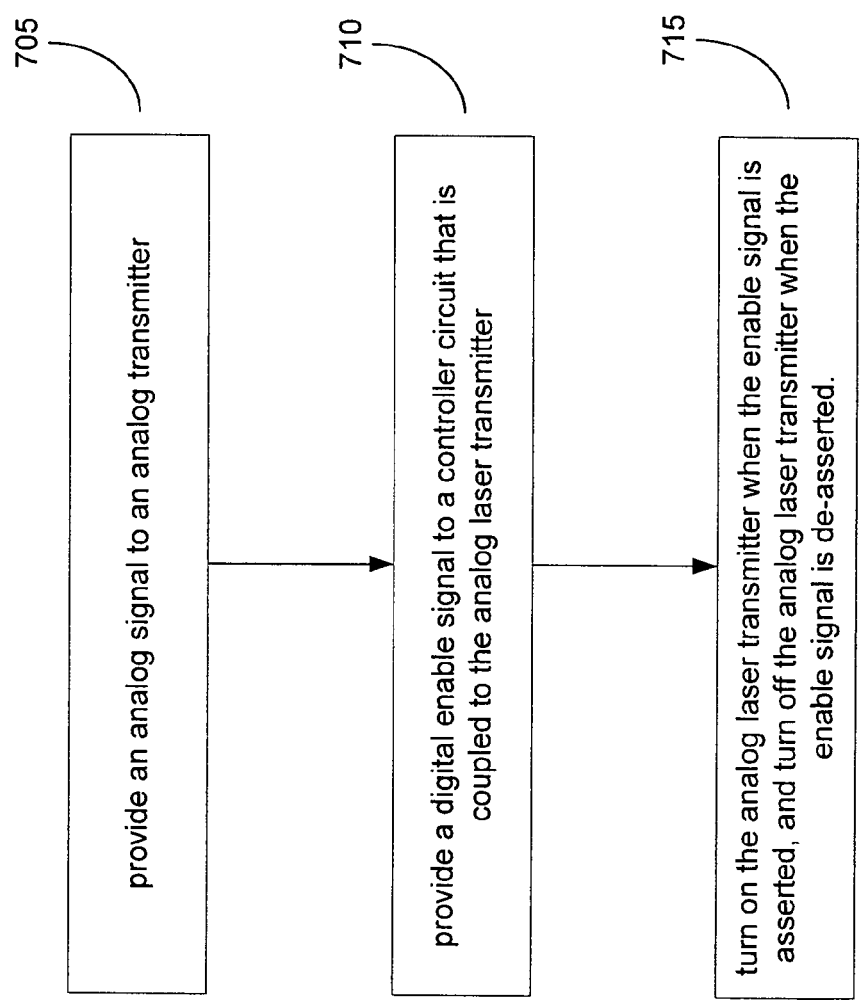
FIG. 7 is a flow chart of a method of operating an analog laser transmitter.

Attention is now drawn to FIG. 7, which is a flow chart of a method of operating an analog laser transmitter. In step 705, an analog signal is provided to the analog laser transmitter. In one exemplary embodiment, the analog laser transmitter is an analog-modulated CATV reverse transmitter of a PON system, and the analog signal is an upstream signal of the PON system. In step 710, a digital enable signal is provided to a controller circuit that is coupled to the analog laser transmitter. In one exemplary embodiment, the digital enable signal is a TDMA control signal of the PON system. In step 715, the analog laser transmitter is turned on when the enable signal is asserted, and alternatively, turned off when the enable signal is de-asserted. The turn on and turn off characteristics have been described above with reference to other figures, and will not be repeated here in the interests of brevity.

In other alternative embodiments, the method includes one or more steps such as providing a reference voltage, providing a ground node, providing an input selector switch, activating the input selector switch using the TDMA control signal to select the reference voltage, whereby the analog-modulated CATV reverse transmitter is turned on, and activating the input selector switch using the TDMA control signal to select the ground node, whereby the analog-modulated CATV reverse transmitter is turned off.

It should be emphasized that the above-described embodiments of the present disclosure, particularly, any "preferred embodiments" are merely possible examples of implementations, merely setting forth a clear understanding of the principles of the disclosure. Many variations and modifications may be made to the above-described embodiments of the disclosure without departing substantially from the spirit of the principles of the disclosure. All such modifications and variations are intended to be included herein within the scope of the disclosure and present disclosure and protected by the following claims.

The following is claimed:

1. An optical system comprising:
   an analog laser transmitter having a burst operative mode; and
   a power controller configured to place the analog laser transmitter in the burst operative mode when a digital enable signal is provided to the power controller, the power controller comprising:
      a reference voltage source;
      a ground node; and
      an input selector switch configured to select the reference voltage source when the digital enable signal is asserted, and alternatively, to select the ground node when the digital enable signal is de-asserted.

2. The optical system of claim 1, wherein the power controller further comprises:
   an integrator with a first input terminal coupled to the input selector switch, a second terminal coupled to a feedback voltage node, and an output terminal coupled to a transistor current-driver;

a transimpedance amplifier configured to convert a laser monitor current into a feedback voltage, the feedback voltage being provided to the feedback voltage node;

a capacitive coupling circuit to couple an electrical input signal into a laser diode of the analog laser transmitter;

a potentiometer operable to set a resistive value that determines a laser monitor current of the laser transmitter; and a feedback circuit comprising the integrator, the transimpedance amplifier, and the potentiometer; the feedback circuit being operative to set a user-determined current flowing through the laser diode.

3. The optical system of claim 2, wherein a damping factor of the integrator is suitably set to generate a fast switching control voltage at the output terminal of the integrator in response to assertion of the digital enable signal, and wherein the fast switching control voltage is applied to a transistor driver circuit that provides the user-determined current flowing through the laser diode.

4. The optical system of claim 3, wherein a user-defined optical power of the analog laser transmitter is determined by at least one of a voltage value of the reference voltage source and the resistive value set in the potentiometer.

5. The optical system of claim 4, wherein upon generating the fast switching control voltage the user-determined current flowing through the laser diode is stabilized within approximately 1 microsecond.

6. The optical system of claim 4, wherein the fast switching control voltage has a transition time of approximately 1 microsecond.

7. The optical system of claim 6, wherein the input selector switch comprises a solid state switch.

8. The optical system of claim 7, wherein the analog laser transmitter is an analog-modulated cable television (CATV) reverse transmitter configured to transmit an upstream signal conforming to the data over cable service interface specification (DOCSIS), and is further configured to transmit the upstream signal into a passive optical network (PON) combiner.

9. The optical system of claim 8, wherein the user-defined optical power of the analog laser transmitter is set at approximately 2 dBm.

10. The optical system of claim 9, wherein the enable signal is a time-division-multiple-access (TDMA) control signal of a PON system comprising the PON combiner.

11. The optical system of claim 10, wherein the analog-modulated CATV reverse transmitter operates in the approximate frequency range of 5 MHz to 42 MHz, and wherein the transmitter is housed inside a cable modem at a customer residence.

12. The optical system of claim 10, wherein the enable signal is a downstream control signal originated by a cable modem terminating system (CMTS).

13. A method of operating an analog laser transmitter, the method comprising:

providing an analog signal to the analog laser transmitter;

providing a digital enable signal to a controller circuit that is coupled to the analog laser transmitter;

providing a reference voltage source;

providing a ground node;

providing an input selector switch; and turning on the analog laser transmitter by activating said input selector switch to select said reference voltage source when the enable signal is asserted, and turning off the analog laser transmitter by activating said input selector switch to select said ground node when the enable signal is de-asserted.

14. The method of claim 13, wherein the analog laser transmitter is an analog-modulated CATV reverse transmitter of a PON system, the analog signal is an upstream signal of the PON system, and the digital enable signal is a TDMA control signal of the PON system.

15. The method of claim 14, wherein the upstream signal of the PON system conforms to DOCSIS.

16. The method of claim 13, wherein said enable signal is one of a group consisting of a time-division-multiple-access (TDMA) control signal, a control signal from a cable modem terminating system (CMTS), and a "signal valid" signal from a carrier detect circuit.

17. The method of claim 13, further comprising providing at least one trigger input signal to enable logic coupled to said controller circuit, said enable logic configured to provide said digital enable signal in response to receiving said trigger input signal.

18. The method of claim 17, wherein said enable logic is configured to receive a plurality of parallel trigger input signals.

* * * * *